Jan. 27, 1925. 1,524,187
C. G. LOWEN
ELECTROMECHANICAL STARTING AND STOPPING DEVICE FOR PHOTOGRAPHIC SHUTTERS
Filed March 13, 1923 8 Sheets-Sheet 5

Inventor
C. G. Lowen
By S. P. Woehauber, Atty.

Jan. 27. 1925.                                              1,524,187
C. G. LOWEN
ELECTROMECHANICAL STARTING AND STOPPING DEVICE FOR PHOTOGRAPHIC SHUTTERS
Filed March 13, 1923          8 Sheets-Sheet 8

Patented Jan. 27, 1925.

1,524,187

UNITED STATES PATENT OFFICE.

CHARLES GEORGE LOWEN, OF LONDON, ENGLAND, ASSIGNOR TO PICTORIAL MACHINERY LIMITED, OF LONDON, ENGLAND, A BRITISH COMPANY.

ELECTROMECHANICAL STARTING AND STOPPING DEVICE FOR PHOTOGRAPHIC SHUTTERS.

Application filed March 13, 1923. Serial No. 624,829.

*To all whom it may concern:*

Be it known that I, CHARLES GEORGE LOWEN, a subject of the King of Great Britain and Ireland, and a resident of London, England, have invented a certain new and useful Improvement in an Electromechanical Starting and Stopping Device for Photographic Shutters, of which the following is a specification.

The present invention relates to an electromechanical starting and stopping device, primarily designed for actuating photographic shutters, but applicable also for actuating other devices, and the said invention is hereinafter set forth with reference to the actuation of a photographic shutter, the object being to obtain a multiplicity of exposures, each exposure having exactly the same duration of time space or exposure.

An electro-mechanical starting and stopping device in accordance with the present invention comprises a dial graduated in seconds for a time space of one minute, a rotatable, adjustable and lockable bezel with fixed pointer thereto to register with said graduations, a clock with seconds hand frictionally mounted on the seconds hand arbor, an electro-magnet, a spring-controlled lever with armature thereto, a circuit-closing switch operable by said control lever, a clock starting and stopping device operable by the control lever, a circuit-breaking switch operable by said clock, a buzzer, a battery or other source of electrical power, a seconds hand returning or re-setting device, and a shutter or other release device, the arrangement being such that on opeating the control lever, the circuit-closing switch is operated, magnet is energized, holding down the control lever, the clock starting and stopping device is actuated by the control lever, starting the clock, the seconds hand is frictionally coupled to the seconds hand arbor, seconds hand travels from set position to zero, buzzer is set in action, giving audible indication that the device is working, but on the seconds hand reaching zero, the circuit-breaking switch is operated, the magnet is de-energized, the control lever, under the action of its spring, returns to normal, opening the circuit-closing switch, buzzer is stopped, seconds hand returned to set position, block starting and stopping device actuated by control lever to stop the clock, and the release device returned to normal.

In order that the invention may be readily understood, reference is to be had to the following description and accompanying sheets of drawings, wherein:—

Like numerals of reference indicate corresponding parts in the several figures.

Figure 1:
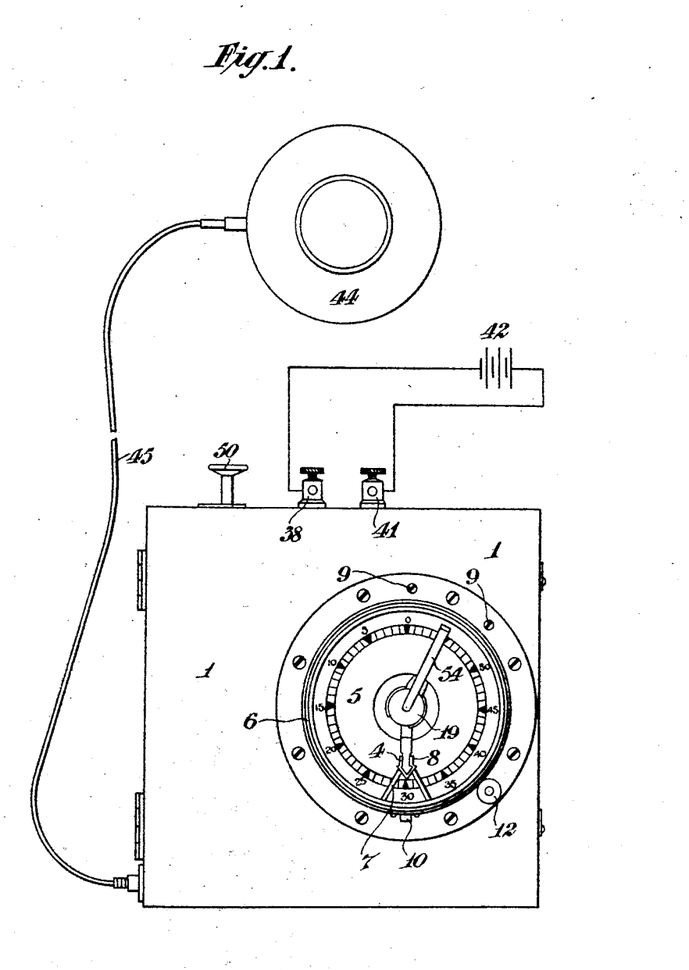
Figure 1 is a front view of the complete device.
Figure 3:
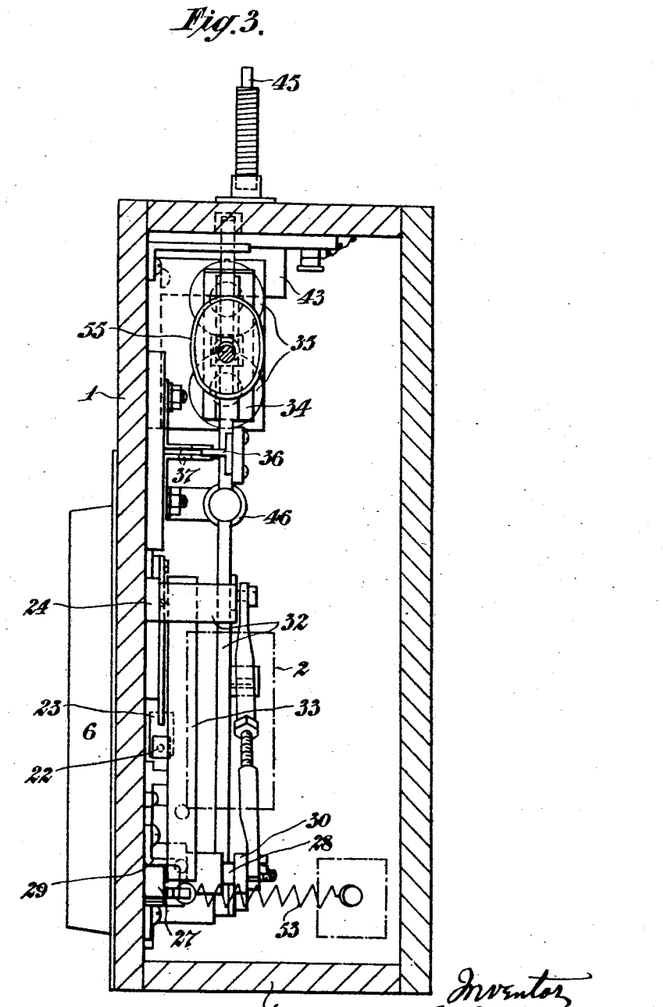
Figure 3 is a top plan view thereof.
Figure 4:
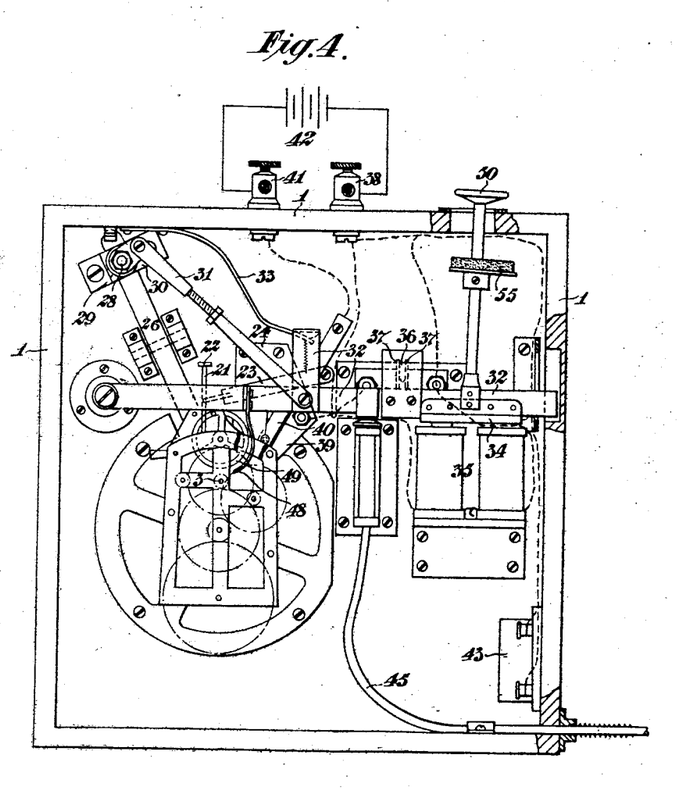
Figure 4 is a similar view to Figure 2, mechanism being shown in operative position.
Figure 5:
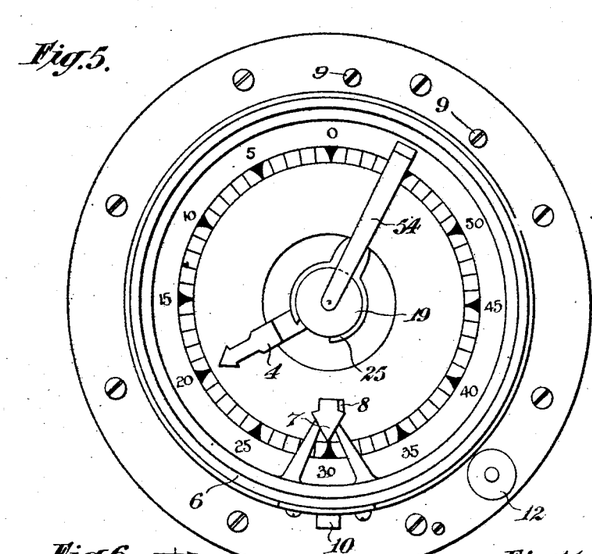
Figure 5 is a view of the bezel and dial of the device drawn to an enlarged scale.

In carrying out the said invention, the device consists of a case 1, Figures 1, 2, 3 and 4, on the inner face of the front wall of which there is mounted a clock 2, of ordinary construction, whose seconds hand arbor 3 extends through a hole in said front wall, and whose seconds hand 4 is adapted to travel over a dial 5, Figures 1 and 5, on the front face of said wall, and which dial 5 is graduated in seconds for a time space of one minute.

Figure 6:
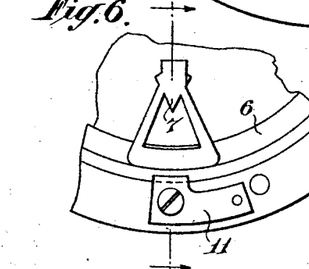
Figures 6 and 7 are, respectively, an inside view and a sectional view of the locking device of the bezel.
Figure 7:
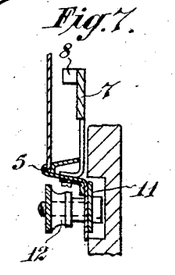

The bezel 6 is rotatably mounted on the front face of the front wall of the casing 1 and is provided with a fixed and inwardly disposed pointer 7 to register with the graduations on the dial, said pointer 7 having a projection 8 thereon which engages against one side of the seconds hand 4 of the clock, stops 9 being provided to engage a projection 10 on the bezel 6 to prevent the complete rotation of the bezel in either direction, and also a locking device which consists of a plate 11, Figures 6 and 7, adapted to be drawn tight up to and clamp the bezel 6 by means of a screw nut 12 to the casing when the pointer 7 of said bezel is in the desired position.

Figure 14:
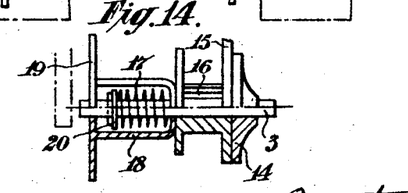
Figure 14 is an enlarged view, partly in section and partly in elevation, of the friction discs and sleeve of said mechanism.

The seconds hand 4, which seconds hand 4 is counter-weighted, is frictionally mounted in its arbor 3 in the following way:—
On the seconds hand arbor 3 and in front of the front plate 13 of the clock, Figures 11, 12, 13 and 14, there is fixedly secured a circular disc 14, and on said arbor 3 there is freely and rotatably mounted another circular disc 15 which is formed in one with or is affixed to a pinion 16 through which the arbor 3 extends, said disc 14 being maintained in light frictional contact with the pinion-carrying disc 15 by means of a coil spring 17 which is carried in a sleeve 18 provided with a flat circular head 19 at the outer end thereof and slidable on the arbor 3, said spring 17 pressing against a pin 20, Figure 14, carried by the arbor 3 and located under said head 19 and against the bottom of said sleeve 18, said sleeve 18 resting on the boss of said pinion 16.

Figure 18:
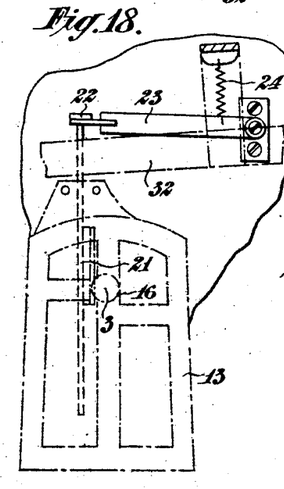
Figure 18 is a view illustrative of the returning or re-setting lever in inoperative position.
Figure 19:
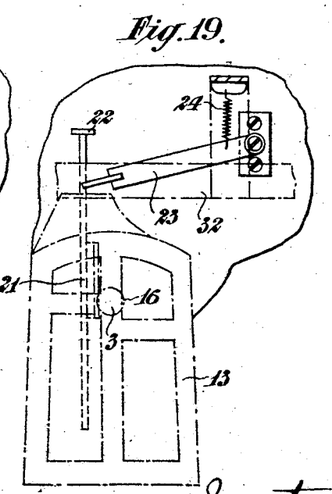
Figure 19 is a similar view, but lever shown in its operative position.
Figure 20:
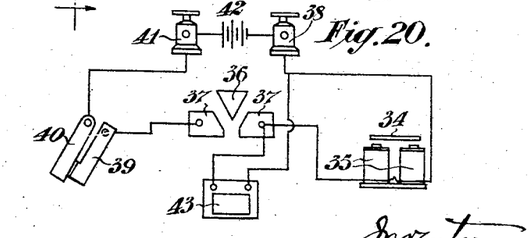
Figure 20 is a diagrammatic view of the circuit of the device.

This pinion 16 engages in a vertically disposed rack 21, Figures 10, 11, 12, 13, 18 and 19, slidably mounted in bearings on the front plate 13 of the clock 2, and the upper end or head 22 of said rack 21 is adapted to be engaged with by the front end of a spring-controlled lever 23 pivotally mounted on the inside of the front wall of the case 1, said spring-controlled lever 23 functioning to return or re-set, through the medium of its spring 24, Figures 18 and 19, and the rack 21, and pinion 16, the seconds hand 4 as hereinafter set forth.

Figure 8:
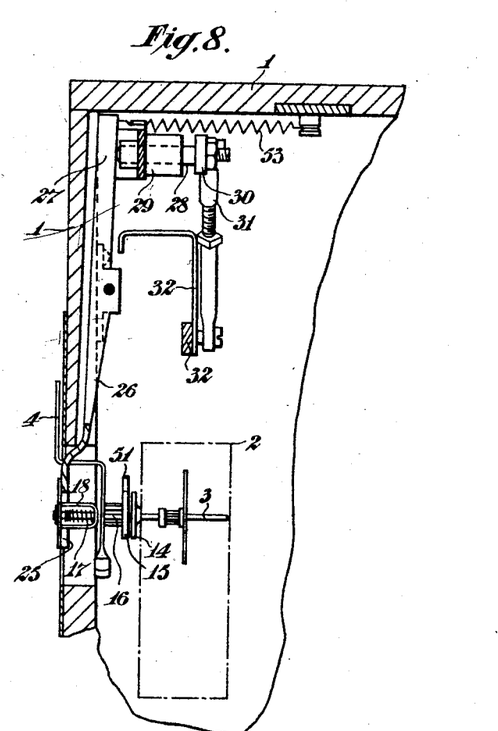
Figure 8 is a fragmentary sectional end view illustrative of the means for putting in action the seconds hand of the clock of the device.
Figure 9:
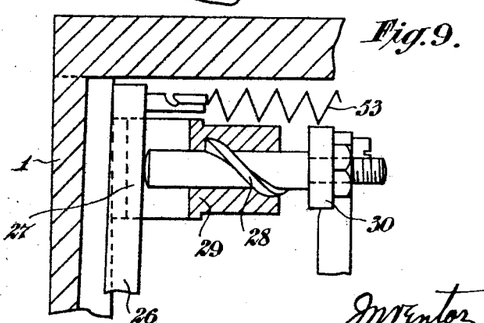
Figure 9 is a detail view, drawn to a larger scale, of the quick-thread screw of said means.
Figure 10:
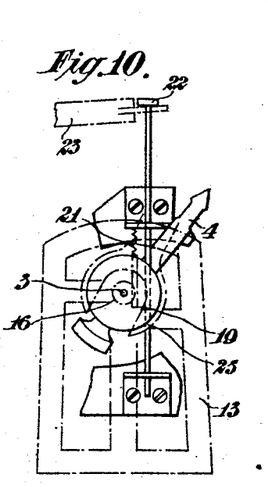
Figures 10 and 11 are views at right angles to one another of the seconds hand mechanism in inoperative position.
Figure 11:
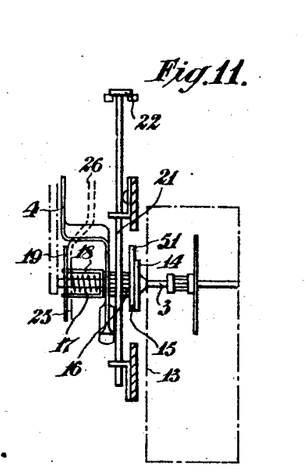
Figure 12:
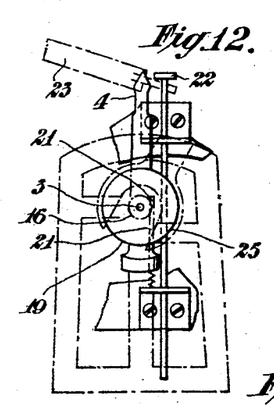
Figures 12 and 13 are similar views, but mechanism shown in operative position.
Figure 13:
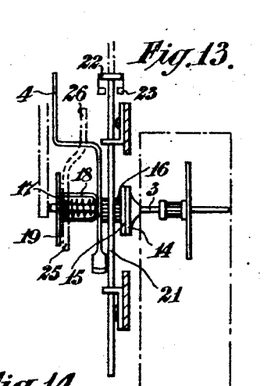

Further, the sleeve 18 aforesaid engages in and is normally outwardly pressed, by the forked end 25 of a spring-controlled lever 26 pivotally mounted on the inside of the front wall, see Figures 2, 3, 4 and 8, and with the other end 27 of said lever 26 there engages the outer end of a quick-pitch screw 28, Figures 8 and 9, carried by a suitable boss 29 on said front wall, whilst the inner end of said screw 28 carries an arm 30 which is pivotally connected to one end of a rod 31, which is adjustable as to length, or to a strainer or screw-shackle, which rod, strainer or shackle is, by its other end, pivotally connected to a control lever 32, Figures 2, 3, 4 and 8, pivotally mounted on the inside of the front wall of the case, and controlled by spring 33.

This spring-controlled lever 32, which lever 32 is the main control lever of the device, carries the armature 34 of an electromagnet 35 affixed to the inside of the case, and also the blade or knife 36 of a knife-switch 37 also affixed to the casing but insulated therefrom, said switch 37, which is the circuit-closing switch, being connected to said magnet 35, and magnet 35 to a terminal 38 on the top of the case, and to another switch 39 affixed to but insulated from said case, said latter switch 39, which is the circuit-breaking switch, being normally closed by means of a spring-controlled contact blade 40 which is connected to the other terminal 41 on the top of the case, said terminals being connected up to a battery 42, Figures 1, 2, 3 and 20, or to other source of electrical power.

Further, and to give an audible indication that the device is working, the circuit-closer switch 37 is connected to one of the terminals of a buzzer 43 (whose other terminal is connected to terminal 38 on top of the case) arranged inside the case, to which inside access is to be had by a hinged back wall or door therein.

The shutter 44, Figure 1, of the camera, which camera may be arranged in any suitable position near to or away from the device, is connected to one end of an Antinous release 45, whose other end is spring-controlled and is carried in a cylinder 46, Figures 2 and 3, mounted in any suitable manner inside the casing and below the control lever 32, said control lever 32 also carrying a plunger 47 adapted, when required, to engage the inner end of said release, or by a Bowden wire, or said shutter may be actuated pneumatically, in which case the control lever would act on the bulb of the pneumatic.

Figure 2:
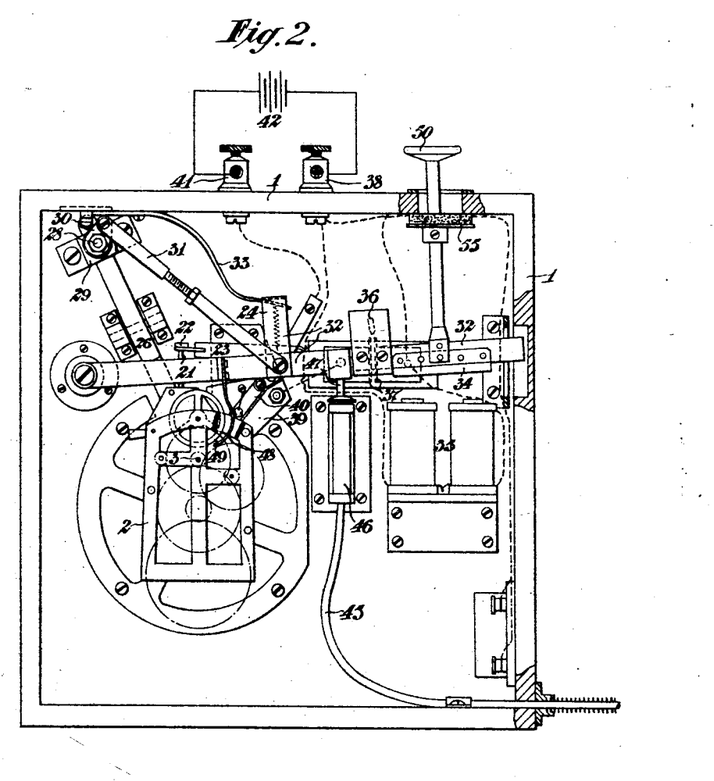
Figure 2 is an inside view of the mechanism thereof in inoperative position.

Further, to start and stop the clock, use is made of a starting and stopping device, that is to say a curved springy blade 48 is carried by the control lever 32 in such position that when the device is not working, the outer and curved end of said blade contacts with the rim of the balance wheel 49 of the clock, see Figure 2, so holding said wheel stationary, but on the depression of the control lever 32 said blade 48 carries round said balance wheel 49 and imparts a kick thereto before breaking contact with the rim of said wheel, setting the clock in motion.

Working of the device:—Suppose it is required to obtain a series of exposures each having a time space of thirty seconds duration, the procedure for each exposure of the series is as follows after the setting of the dial:—

The lock of the bezel 6 is freed by slackening the screw nut 12, and said bezel 6 is turned till its pointer 7 registers with thirty on the dial, see Figures 1 and 5, dial reading from zero in an anti-clockwise direction, and the bezel 6 is then locked in this position by tightening up the nut 12 aforesaid. This turning movement of the bezel 6 effects, at the same time, by reason of the projection 8 on the pointer 7 of said bezel 6 engaging the seconds hand 4, the coresponding movement of said seconds hand 4 so that both pointer and the seconds hand register with 30 on the dial.

On depressing, and then letting go, a knob 50, Figures 1, 2 and 4, carried by the control lever 32, and arranged exterior of the case 1, there is effected, at one and the same time, and by the depression of said lever 32 (1) the turning of the quick-pitch screw 28 which engages the end 27 of the spring-controlled fork-end lever 26, causing the fork-end 25 of said lever 26 and with it the sleeve 18 on the seconds hand arbor 3 to move inwards and hold the pinion-carrying disc 15 in tight frictional contact with the fixed disc 14 on said arbor 3; (2) the depression, Figures 4, 12, 13 and 19, of the spring-controlled returning or re-setting lever 23; (3) the engagement of the knife or blade 36 with the circuit-closer switch 37, so energizing the electro-magnet 35 and holding down the control lever 32; (4) the setting in action of the buzzer 43; (5) the starting of the clock 2 by means of the springy blade 48 setting in action the balance wheel 49 of the clock; and (6) the actuating of the shutter release, with consequent opening of the shutter 44 of the camera.

Figures 15, 17:
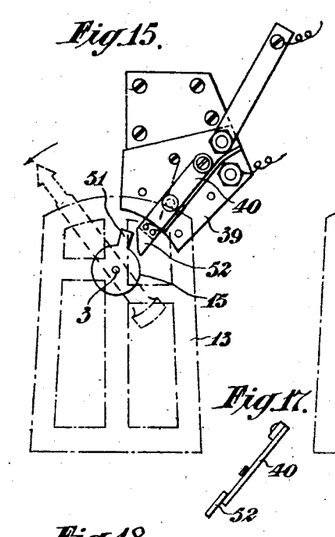
Figure 15 is a detail view of the circuit-breaker switch in closed position.
Figure 17 is a side view of the spring-controlled blade of said switch.
Figure 16:
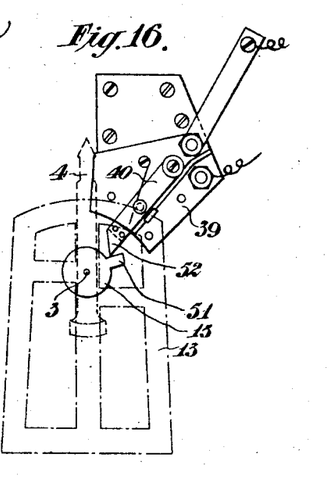
Figure 16 is a similar view, but in open position.

The seconds hand 4 now travels over the dial 5 from 30 towards zero in a clockwise direction, and in so doing the pinion 6 of said seconds hand 4 pushes downwards the slidably mounted rack 21 till such time as said seconds hand 4 reaches zero, whereupon a projection 51 on the pinion-carrying disc 15 engages with the front and insulated portion 52, Figures 15, 16 and 17, of the spring-controlled contact blade 40 of the breaker switch 39, throwing said blade 40 over and breaking the circuit, see Figure 16.

The following actions then simultaneously take place:—(1) buzzer 43 is put out of action; (2) the magnet 35 is de-engerized; (3) the control lever 32 under the action of its spring 33 flies upwards, withdrawing the knife 36 from the circuit-closer switch 37; (4) pressure is removed from the release 43, whereupon the shutter 44 of the camera closes under its spring action; (5) the quick-pitch screw 28 is run back, allowing the fork-end 25 of the lever 26, under the action of its spring 30, Figures 3, 8 and 9, to swing on its pivot and push back the sleeve 18 on the seconds hands arbor 3 and the pinion-carrying disc 15 thereon; (6) the returning or re-setting lever 23, under the action of its spring 24, flies up and its outer end engages the upper end or head 22 of the slidable rack 21, raising said rack 21, which rack 21 now, through its engagement with the pinion 16, turns the same in reverse direction and with it the seconds hand 4 to 30 again; (7) the contact blade 40 of the breaker switch 39, under the action of its spring, and the moving away of the projection 51 on the pinion-carrying disc 15 which engaged it, returns to its normal position, closing said switch 39, whereupon the device is ready for another exposure, and so on.

To prevent endwise movement of the seconds hand arbor 3, there is provided an arm 54, Figures 1 and 5, extending from the side of the dial to over the centre of said arbor and in close proximity to the outer end thereof.

To prevent any jarring of the device on the return of the control lever 32, the same is provided with a buffer 55 of any suitable material or construction to engage against the underside of the top of the case.

From the foregoing description it will be readily understood that devices other than photographic shutters can be actuated from the control lever, or the circuit of electrical devices, worked for a few seconds only, can be made and broken.

Further, if the device be required to work for a time period of one minute to one hour, then the travelling hand, which will now be the minute hand, will be mounted on the minute arbor in similar manner obtaining with reference to the seconds hand, the fork-ended spring-controlled lever being lengthened accordingly, and the dial graduated to read for a time space of one hour.

I claim:—

1. In a device of the character described, the combination of a graduated dial, a rotatable bezel associated with said dial, a pointer carried by the bezel and adapted to be set to register with selected points on said dial, a clock having an arbor, a hand carried by the arbor and operating from said dial, a lever, an electromagnet, a switch device included in circuit with the electromagnet, a manually operated member for depressing the lever and closing the switch to cause the magnet to hold the lever depressed, means carried by the lever to release the clock to operate the said hand, and means controlled by the movement of said hand for breaking the circuit to release the lever from the magnet.

2. In a device of the character described, the combination with a dial graduated in seconds for a time space of one minute, a rotatable bezel associated with said dial, a pointer fixed to the bezel to register with said graduations, means for locking said bezel in a predetermined position of adjustment, a clock including seconds hand arbor, a seconds hand frictionally mounted on said arbor, an electro-magnet a spring-controlled lever with armature thereto, a circuit-closing switch operable by said control lever, a clock starting and stopping device operable by the control lever, a circuit-breaking switch operable by said clock, a buzzer, a source of electrical power, a seconds hand returning or re-setting device, and a shutter release device.

3. An electro-mechanical starting and stopping device, characterized by the combination of a spring-controlled operating lever with an armature thereon, an electro-magnet, a release operable by said control lever, a quick-pitch screw operably and adjustably connected to the control lever, a spring-controlled lever whose one end engages the free end of the quick-pitch screw and whose other end is forked and engages behind the head of a spring-controlled sleeve slidably mounted on the seconds hand arbor and adapted to bear on the boss of a pinion freely mounted on said seconds hand arbor, a seconds hand fixedly carried by the boss of said pinion, a circular disc fixedly mounted on the inner end of said pinion, a circular disc fixedly mounted on said seconds hand arbor, a vertically disposed slidably mounted rack engaging said pinion, a spring-controlled pivotally mounted lever adapted to engage the head of said rack, a projection on the pinion disc, a circuit-breaking switch whose spring-controlled blade is adapted to be engaged by the projection of the pinion disc, a knife switch, a knife carried by the control lever to engage with said switch, a buzzer to give an audible signal, a clock starting and stopping device, a dial graduated in seconds for a time space of one minute, a rotatable, adjustable and lockable bezel with fixed pointer thereto, and a projection on said fixed pointer to engage the seconds hand to limit the travel of said seconds hand when setting or re-setting the same, as herein described.

In testimony whereof I have affixed my signature hereto this 14th day of February, 1923.

CHARLES GEORGE LOWEN.